United States Patent

[11] 3,593,405

| [72] | Inventor | George G. Hahn |
| | | Fort Wayne, Ind. |
| [21] | Appl. No. | 855,720 |
| [22] | Filed | Sept. 5, 1969 |
| [45] | Patented | July 20, 1971 |
| [73] | Assignee | General Electric Company |

[54] APPARATUS FOR FORMING WINDING END TURNS
14 Claims, 12 Drawing Figs.

| [52] | U.S. Cl. | 29/205 D |
| [51] | Int. Cl. | H02k 15/06 |
| [50] | Field of Search | 29/205 R, 205 C, 205 D, 596; 72/354 |

[56] References Cited
UNITED STATES PATENTS

| 2,814,096 | 11/1957 | Herbrecht | 29/205 |
| 2,980,157 | 4/1961 | Rediger | 29/596 |
| 3,324,536 | 6/1967 | Hill | 29/205 |
| 3,402,462 | 9/1968 | Walker et al. | 29/596 |

*Primary Examiner*—Granville Y. Custer, Jr.
*Attorneys*—John M. Stoudt, Radford M. Reams, Ralph E. Krisher, Jr., Frank L. Neuhauser and Oscar B. Waddell ABSTRACT: An apparatus for forming magnetic core winding end turn assemblies includes a center-mounting member to receive the cores thereabout. Arcuate outer jaws are positioned to be outside the end turn assembly and arcuate inner jaws are positioned to be inside the end turn assembly. The jaws are connected to cams outside the end turn assembly, the inner jaws by arms positioned axially beyond the end turn assembly, which are actuated for moving the jaws toward each other to confine the end turn assembly. A forming ring is movable relative to the core between the jaws for applying a compressive force on the end turn assembly to form the assembly into a compact mass. There is a stop, movable relative to the forming ring for regulating the amount of movement of the forming ring. The apparatus has two forming units, each having inner jaws, outer jaws and a forming ring. One forming unit is axially movable relative to the center-mounting member to allow insertion and removal of cores.

APPARATUS FOR FORMING WINDING END TURNS

BACKGROUND OF THE INVENTION

The present invention relates to apparatus for forming winding end turns and more particularly for forming and shaping hollow magnetic core winding end turns.

In conventional dynamoelectric machines, such as small or fractional horsepower induction electric motors for instance, the magnetic stator core is provided with a rotor receiving bore and radial winding receiving slots positioned outwardly of the bore. A predetermined number of coils of copper wire, coated with insulation such as enamel, are arranged within the slots to form the excitation windings of the motor. These coils have end turns extending outside the slots axially beyond the sides of the stator core.

It is highly desirable to shape or form these winding end turns into a compact mass adjacent the core side and away from the bore. At the same time it is necessary to assure that the various wires making up the winding are not damaged during the forming process. Moreover motors of different electrical performance may have essentially the same stator core and differ only in the amount of wire in the winding or in the gage or type of wire used. Each of the types of motors require a different amount of force than the others to form the end turns into a compact mass. Also, many motor manufacturing plants produce a number of motor sizes, that is motors which differ in the length of the core. It is highly desirable to have an apparatus for automatically forming the winding end turns into a compact mass, which apparatus is easily adjustable to form winding end turns requiring different forces and which will accommodate stator cores of various lengths.

There are a number of prior art apparatus designed for this general purpose, such as that shown and described in U.S. Pat. No. 2,980,157, issued to Alvin L. Rediger on Apr. 18, 1961, and assigned to General Electric Company, the assignee of this invention. None of these prior art apparatus have been completely satisfactory. One problem never completely solved by the prior art apparatus arises from the fact that, prior to forming or shaping the end turns, one or more individual wires often are positioned in alignment with the bore. Prior art devices do not include means for insuring all the end turns are cleared from the bore and aligned with the forming mechanism prior to forming. Thus the forming mechanism of prior art devices did not always engage all the end turns and, on occasion, some of the wires would become entangled with the forming mechanism and be damaged.

A number of prior art mechanisms included jaws which moved against the end turn outer, inner and end surfaces simultaneously. With such arrangements wires could become caught between jaws and damaged.

In at least most prior art apparatus the core was aligned relative to the forming mechanism by engagement of the radially outer edge of the side of the core with a mating surface of the apparatus. Normal core manufacturing methods and equipment often leave these portions of the cores uneven and with burrs. Thus, in prior art apparatus, the core at times will not be properly positioned relative to the forming mechanism. This can result in improperly formed end turns.

SUMMARY OF THE INVENTION

It is therefore an object of the invention to provide improved apparatus for forming and shaping winding end turns.

It is another object to provide such an improved apparatus which assures proper alignment of the end turns with the forming mechanism and away from the bore prior to the forming operation.

It is a further object of this invention to provide such an improved apparatus which is capable of exerting an adjustable forming force on the winding end turns and will accommodate various length cores.

It is a still further object to provide such an improved apparatus which confines end turns in a first direction and then applies a compressive force in a second direction.

It is a further more specific object to provide such an improved apparatus including a center-mounting member for positioning the core and aligning the end turns with the forming mechanism.

It is still another object of this invention to provide such a mechanism which will simultaneously form end turns on both sides of the core.

In carrying out the invention in one form, I provide an improved structure for forming at least one magnetic core winding end turn assembly. The apparatus includes a center-mounting member for receiving the magnetic core thereabout. First and second wall means are spaced apart in a first direction relative to the core to receive the end turn assembly therebetween. At least one of the first and second wall means is movable relative to the other for confining the end turn assembly in a first direction relative to the core. Third wall means is movable in a second direction relative to the core between the first and second wall means for applying a compressive force on the end turn assembly to form it into a compact mass.

BRIEF DESCRIPTION OF THE DRAWINGS

The subject matter which I regard as my invention is particularly pointed out and distinctly claimed in the concluding portion of the specification. My invention, itself, however, both as to its organization and method of operation, together with further advantages thereof, may best be understood by reference to the following description taken in connection with the accompanying drawings.

In the drawings.

DESCRIPTION OF THE PREFERRED EMBODIMENT

Figure 1:
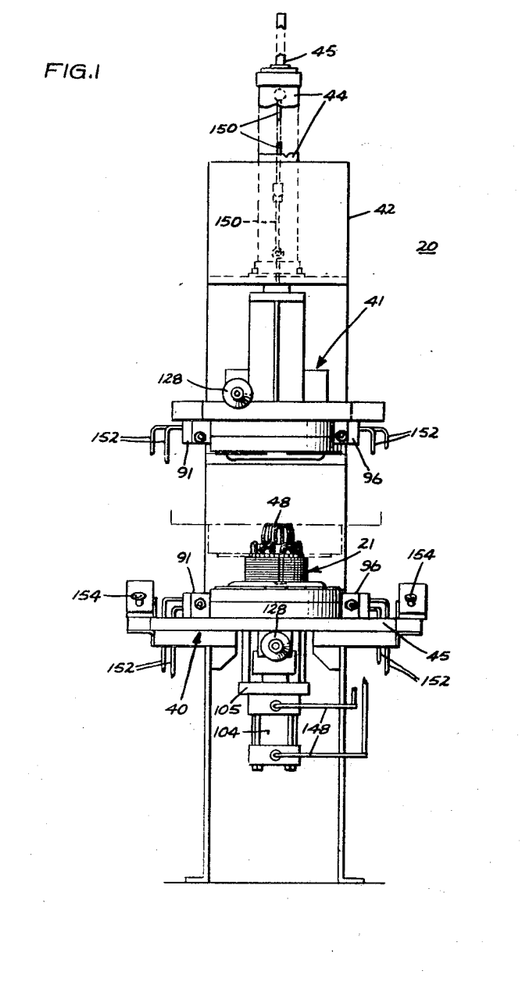
FIG. 1 is a front elevational view of an improved winding end turn forming apparatus constructed in accordance with the present invention and with some parts broken away for simplicity.
Figure 2:
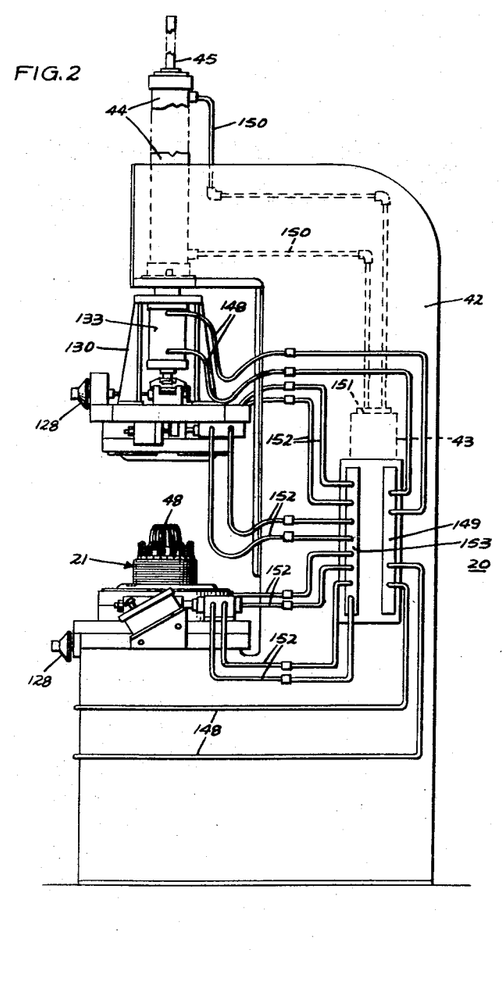
FIG. 2 is a side elevational view of the apparatus of FIG. 1.

Referring now to the drawings in more detail, FIGS. 1 and 2 illustrate the general construction of a complete apparatus 20 for forming and shaping the winding end turns of an electric motor stator core member 21. The preferred embodiment of my apparatus has means to form simultaneously the winding end turns of both sides of the stator core member 21.

By way of example only, stator core member 21 is illustrated as being of the type commonly employed in alternating current induction motors of the fractional horsepower frame size. Briefly described (see FIGS. 5, 6, 11 and 12 in particular), stator core member 21 is conventionally formed with a laminated magnetic core 22, including a main or yoke section 23 with teeth 24 extending radially inwardly therefrom to form a plurality of coil winding receiving slots 25 and a rotor receiving bore 26. Each slot 25 is provided with an insulating liner 27 of standard configuration which normally extends outwardly at each end or side of the core. A main or running winding 28, wound from a plurality of turns of enamel wire, has coil sides 29 arranged in the bottom of predetermined ones of the slots and has end turns 30 and 31 extending axially beyond the respective stator core side faces 32 and 33. A start winding 34 is arranged beneath the main winding in predetermined ones of the slots and has coil sides distributed within the slots and end turns 35 and 36 positioned adjacent the main winding end turns 30 and 31. The windings 28 and 34 are electrically insulated one from the other by electrically insulating means 37, such as a plurality of sheetlike members interposed between the respective winding sides and end turns. The starter winding normally is mechanically displaced with respect to the main winding; that is, the end turns of the main winding bridge the gaps between individual start winding coil groups and the end turns of the start winding bridge gaps between the individual main winding coil groups. The core 22 is also provided with a shallow longitudinally extending slot 38 for a purpose to be hereinafter described.

Referring again particularly to FIGS. 1 and 2 it will be seen that to simultaneously form or shape the winding end turns on both sides of the core, the apparatus 20 includes a lower end turn forming unit 40 (as seen in the drawings) and an upper end turn forming unit 41 (as seen in the drawings). Both of the forming units are mounted on and supported by a generally C-shaped frame 42 so as to be in spaced apart alignment. The frame also serves as a support and housing for other components of the apparatus such as the hydraulic power unit 43 and various electrical components (not shown). In operation, a stator core 21, with unformed or unshaped end turns is placed in the lower unit 40 with one set of end turns received within the lower unit. Then the upper unit 41 is moved from its solid line position (in FIG. 1) to its dotted line position (in FIG. 1) so the upper or other set of end turns are received within the upper forming unit. The upper forming unit is moved by means of a first hydraulic unit 44 having a piston 45 which is connected to the upper forming unit 41 for purposes of moving it vertically with respect to the lower forming unit.

Figure 3:
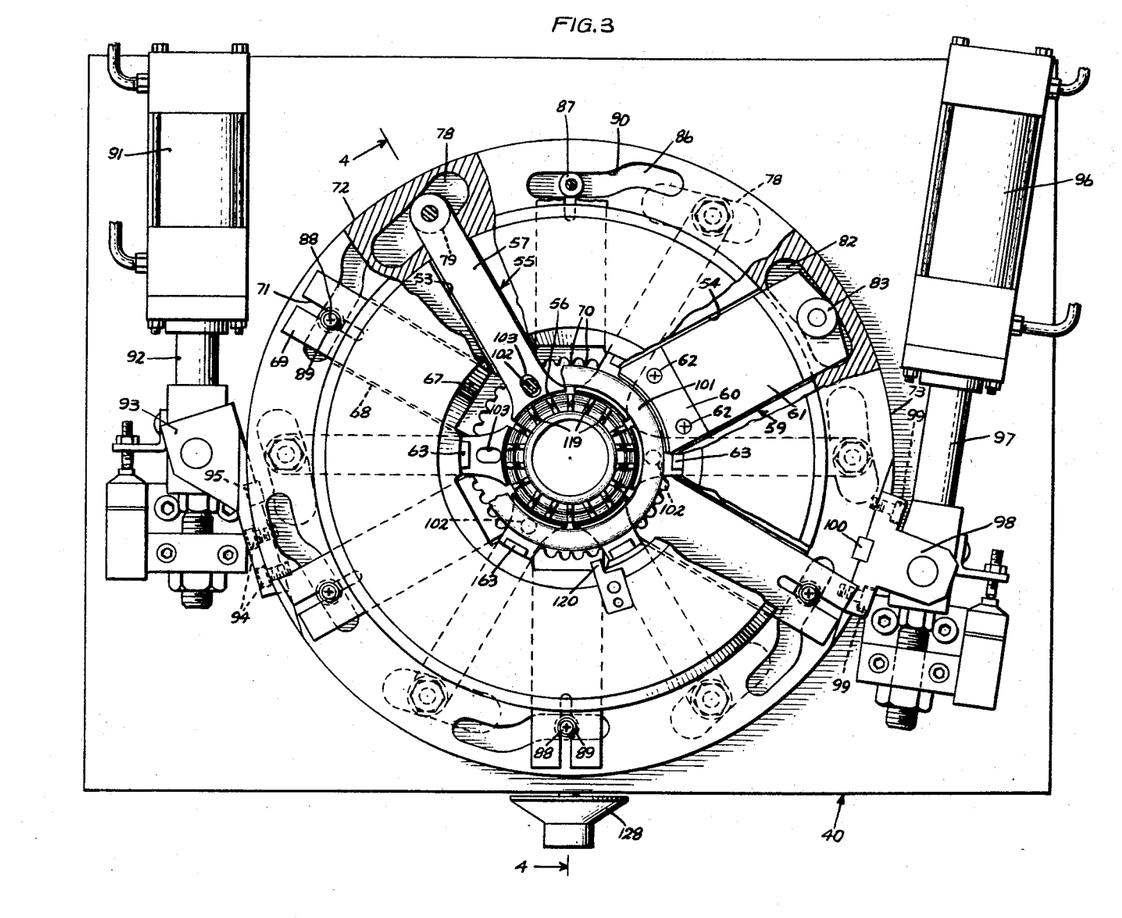
FIG. 3 is a top plan view of the lower winding end turn forming unit of the apparatus of FIG. 1 partially broken away and with certain parts in section for illustration.
Figure 4:
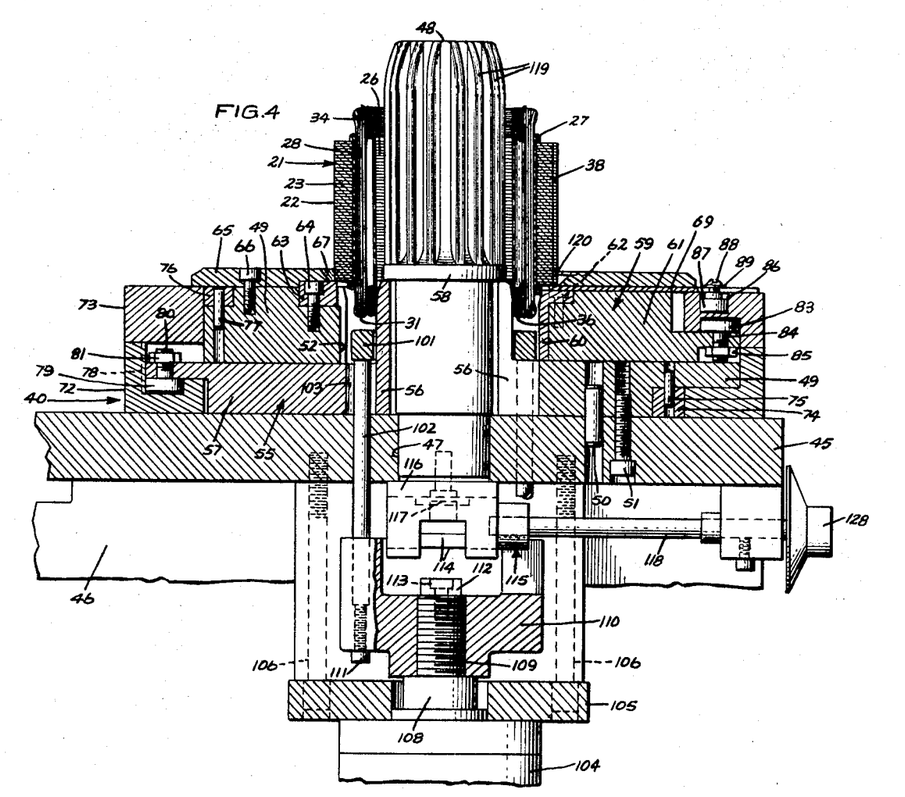
FIG. 4 is a partial side elevational view of the lower winding end turn forming unit, partially in section as seen along line 4-4 in FIG. 3.

Referring now also to FIGS. 3 and 4, there is illustrated in more detail various aspects of the lower forming unit 40. Unit 40 includes a baseplate 45 which is firmly attached to a supporting member 46 of the support frame 42. The baseplate 45 has a central aperture 47 formed therein for positioning and supporting a central mounting member or center post 48 in a manner to be described in more detail hereinafter. A cam plate 49 is mounted on the baseplate 45 by suitable means such as dowel pins 50 and bolts 51, which are received in appropriate openings provided in the base plate 45 and the cam plate 49. It will be understood that, in the usual manner, the dowel pins are used to properly position the cam plate until the bolts have been inserted for securely holding the two members together.

The cam plate defines a central opening 52 disposed around and spaced from the center post 48. Also, the cam plate is provided with a plurality of generally radially extending, angularly spaced apart guide slots 53 in its lower surface and a plurality of generally radially extending, angularly spaced apart guide slots 54 in its upper surface. It will be noted that the lower guide slots 53 and the upper guide slots 54 are offset one from the other so that, in a plan view such as FIG. 3, there will be alternately upper and lower guide slots.

Each of the guide slots 53 receives an inner forming member 55 to guide it for generally radial movement. Each of the forming members 55 includes an inner forming jaw 56, which extends generally parallel to the inner post 48, and an arm 57 extending radially outwardly from one end of the corresponding jaw 56 through the guide slot. Thus, as the arms 57 move radially outward in the slots 53, the jaws 56 move from their retracted position, in alignment with a ledge 58 of the center post 48, to their extended position, outwardly of the center post. Conversely, as the arms 57 move radially inward, the jaws move inwardly toward the center post and are received generally under the ledge 58.

Each of the upper guide slots 54 receive an outer forming member 59, which includes an outer forming jaw 60 attached to the inner end of an arm 61 by some suitable means such as bolt 62. Each of the arms 61 slide radially within a mating guide slot 54 to move its outer jaw 62 radially relative to the mounting member 48 between a retracted position away from the mounting member and an extended position closer to the mounting member.

A number of small inserts 63 of hardened steel are attached to the radially inward upper surface of the cam plate 49 by some suitable means such as bolts 64. These inserts 63 are positioned so that their radially inward portions will be in an interferring relationship with the yoke section 23 of a stator core placed about the central mounting member 48. Thus a core placed over the mounting member will rest on these inserts.

A ringlike guide plate 65 is mounted to the upper surface of the cam plate 49 by bolts 66 and is positioned so that its radially inner edge 67 is outside the outer circumferential surface of a stator core placed about the mounting member 48. The guide plate is provided with a number of generally radially extending slots 68 which are positioned over the guide slots 54 and outer forming members 59. Each of these guide slots 68 receives an elongated cuff or wire support 69 for radial movement relative to the mounting member 49. The inner end of each cuff support is provided with a number of spaced teeth 70 which are shaped to fit closely about corresponding ones of the slot liners 27 as they extend outwardly from the side face of a stator core. The other end of each cuff support is provided with an elongated slot 71.

In order to move the inner forming members 55, the outer forming members 59 and the cuff supports 69 between their radially inner and radially outer positions there is provided an inner cam ring 72 and an outer cam ring 73. The inner cam ring 72 fits closely about the lower portion of the cam plate 49 and against the baseplate 45. A number of bearing members 74 are mounted to the cam plate 49 by the some suitable means such as dowel pins 75 and/or bolts (not shown) to engage the radially inner edge of the inner cam ring 72. A number of similar bearing members 76 are attached to the upper portion of the cam plate 49 by means including dowel pins 77 to engage the radially inner edge of the outer cam ring 73. It will be understood that the bearings 74 and 76 may be constructed of hardened steel or similar material to provide a long wearing surface for engagement with the cam rings. The inner edge of the inner cam ring 73 is in interferring relationship with the outer edge of the guide plate 65 so that the guide plate effectively holds the outer cam ring in place against the inner cam ring. The inner cam ring, around selected portions of its circumference, has an overlapping or interferring relationship with the lower portion of the cam plate 49 (see the right-hand side of FIG. 4).

The inner cam ring 72 is provided with a series of cam recesses 78, there being one recess for each of the inner forming members 55. Each forming member 55 is connected to its associated cam recess by a cam roller 79 which fits closely within the recess 78. Each of the rollers 79 includes a threaded shaft 80 which extends through an opening adjacent the outer end of the associated arm 80 and is held therein by a suitable nut 81. The cam recesses 78 are disposed in a diagonal or offset manner within the inner cam ring so that, as the cam ring is rotated about the cam plate, the rollers 79 moving within the recesses 78 will cause the associated inner forming members to be moved radially between their retracted and extended positions.

Similarly the outer cam ring 73 is provided with a plurality of cam recesses 82 which receive cam rollers 83. The cam rollers 83 are attached to the arms 61 of the outer forming members 59 by shafts 84 and nuts 85 so that, as the outer cam ring 73 is rotated about the cam plate, the outer forming members 59 are moved between their retracted and extended positions. The outer cam ring 73 is also provided with a second plurality of cam slots 86 which receive cam rollers 87. Each of the cam rollers 87 is connected to a bolt or screw 88 which extends through the elongated slot 71 of an associated cuff support 69 and is provided with a flange or washer 89 which engages the cuff support 69. Thus, with the bolts 88 tightened, the cam rollers 87 within the slots 86 will cause the cuff supports to be moved between their retracted and extended positions as the outer cam ring 73 is rotated about the cam plate 49. The bolts 88 may be loosened so that the cuff supports 69 can be manually adjusted to vary the extent of inward movement of the cuff support. With the cuff supports appropriately adjusted their toothed ends 70 will come into engagement with the slot liners 27 to support the slot liners and coil slots adjacent the sides of the cores during the end turn forming process. On the other hand, the cuff supports may be adjusted so that they do not come into play during the end turn forming process, if that is desired.

It will be noted that the cam recesses 78 and 82 are complementarily formed so that the inner and outer end turn forming members 55 and 59 are moved between their retracted and extended positions simultaneously, assuming the cam rings 72 and 73 are rotated simultaneously. On the other hand, the cam recesses 86 are provided with knee sections 90. With this arrangement, assuming the cuff supports are positioned to engage the slot liners in their extended positions, the cuff supports will move inwardly prior to any substantial movement of the inner and outer forming members and the slot liners and coil sides will be supported prior to the engagement of the end turns by the inner and outer forming members.

A first hydraulic cylinder 91 and piston 92 are pivotally connected to a driving member 93. The driving member 93, in turn, is connected to the inner cam ring 72 by some suitable means such as bolts 94 and key 95. Similarly a hydraulic cylinder 96 and piston 97 are pivotally connected to a driving member 98. The driving member 98 is connected to the outer cam ring 73 by some suitable means such as bolts 99 and key 100. When the cylinders are energized to drive the pistons in a first direction, they cause the cam rings to rotate in a first direction; and when the cylinders are energized to drive the pistons in the opposite direction, they cause the cam rings to rotate in the opposite direction.

Referring now particularly to FIGS. 3 and 4, there is a forming ring 101 positioned between the inner and outer forming members and, more particularly, between the inner and outer forming jaws 56 and 60. The forming ring is positioned axially between the inner forming member arms 57 and the axial extremity of unformed end turns of a motor stator core received about the mounting member 48. The forming ring is attached to three rods 102 which extend longitudinally from the forming ring through elongated slots 103 in ones of the inner forming member arms 57. While, in the exemplification, there are only three rods 102, each of the arms 57 is provided with a slot 103 so that the inner forming members 55 may be used interchangeably in the manufacturing process.

A hydraulic cylinder 104 is mounted on a frame 105 which, in turn, is connected to the underside of baseplate 45 (as seen in FIGS. 1 and 4) by suitable means such as bolts 106. The cylinder 104 drives a piston 108 in a generally vertical direction (as seen in the drawings). The distal end of the piston 108 is threaded as indicated at 109 and is received in an associated threaded opening in a ringlike adapter 110. The rods 102 extend downwardly and are received in mating openings in the adapter 110 and connected thereto by bolts 111. Thus as the cylinder 104 is energized selectively to move the piston upwardly and downwardly, the adapter 110 carries the rods 102 and, thus, the forming ring 101, longitudinally between the inner and outer forming jaws.

A hardened steel insert 112 is mounted to the end of threaded portion 109 and cooperates with flats 114 provided on cylinder stop 115 to control the length of the stroke of the piston. To this end the stop 115 is rotatably received in a mounting member 116. The mounting member in turn is connected by bolts 117 to the lower end of the central mounting member 48. The mounting member 116 is sufficiently large to have an interferring relationship with the lower surface of baseplate 45 surrounding the aperture 47. Thus, with the mounting member 116 connected to the center post 48, the center post is firmly mounted to the baseplate 45.

Figures 9, 10:
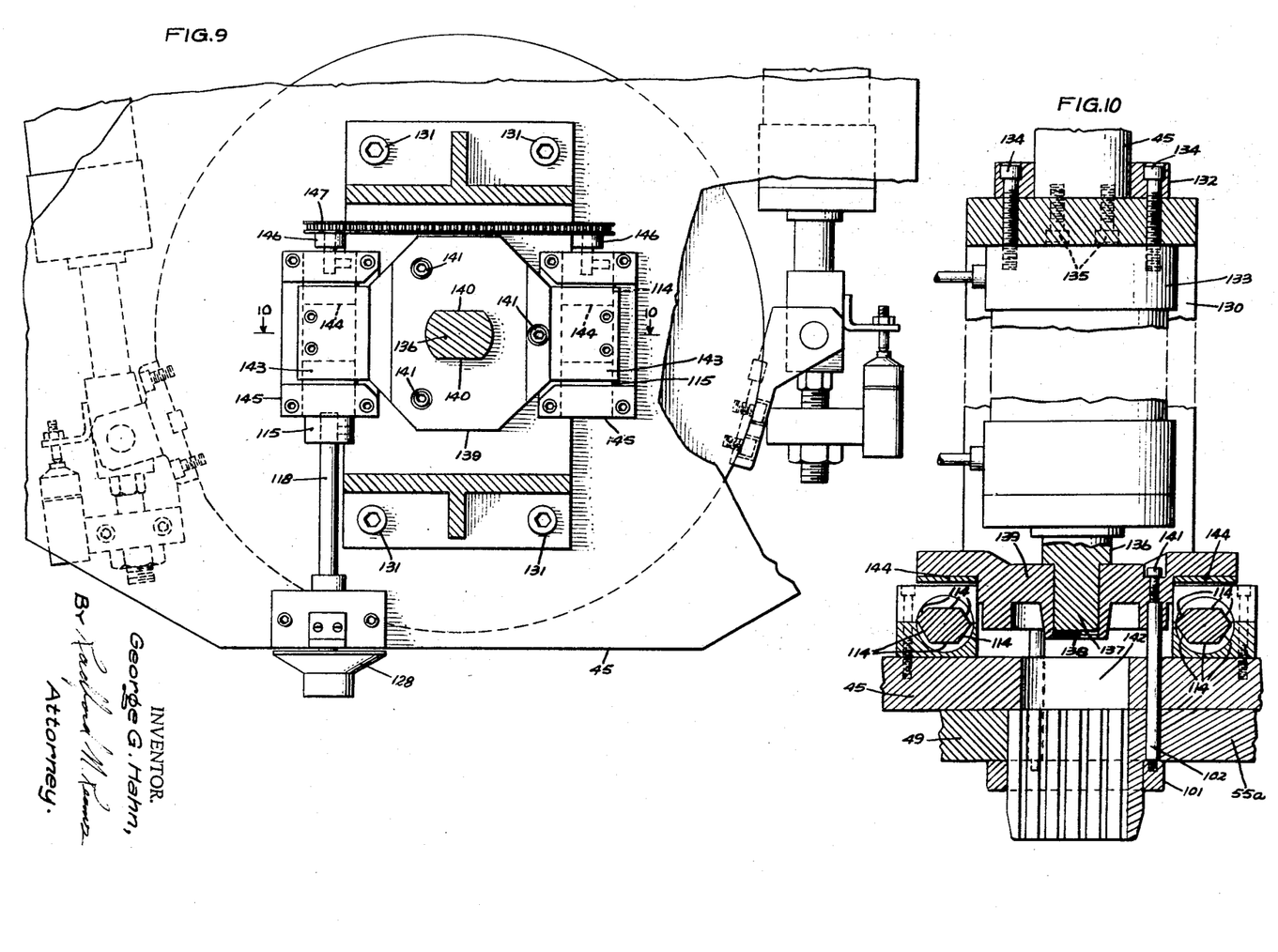
FIG. 9 is a fragmentary view of the upper forming unit taken generally along line 9-9 in FIG. 8.
FIG. 10 is a fragmentary view of the upper forming unit taken along line 10-10 in FIG. 9.

The cylinder stop 115 is connected by a rod 118 to a manual adjustment knob 128 so that a selected one of the flats 114 is presented to the insert 112. As best seen in FIG. 10 the flats on each cylinder stop are provided at different distances from the axis of the cylinder stop. Thus, depending upon the setting of the cylinder stop, the longitudinal movement of the associated piston will be terminated at different positions. This enables the operator to manually set the distance the forming ring will move between the inner and outer forming jaws and thus control the force exerted against the end turns.

Referring now particularly to FIG. 4 there will be described a typical sequence of operation of the apparatus as thus far described. The operation begins with the inner and outer forming members 56 and 59 in their retracted position and the piston 108 and forming ring 101 in their downward or retracted positions. A stator core 21, having main and start windings 28 and 34 respectively received in the slot therein, is inserted over or placed about the center post or mounting member 48 until the yoke section comes to rest on the inserts 63. It will be noted that the center post 48 includes a plurality of generally radial ribs 119 which are slightly curved or rounded at their upper end. These ribs will engage any stray wires from the windings, which may be within the limits of the bore 26, and force them outwardly. When the core 21 comes to rest on the insert 63, the lower end turns 31 and 36 are positioned between the inner and outer jaws 56 and 60.

Next the cylinders 91 and 96 are energized to move the pistons 92 and 97 in a first direction. The pistons act through driving members 93 and 98 to rotate the inner and outer cam rings 72 and 73 in opposite directions. Thus the inner forming members 55 are pulled outwardly from their retracted to their extended positions while the outer forming members 59 are pushed inwardly from their retracted to their extended positions and the cuff supports are pushed inwardly from their retracted to their extended positions. In fact the knees 90 of the cam recesses 86 cause the cuff supports 69 to move more rapidly than either of the inner and outer forming members so that the slot liners 27 and adjacent portions of the wires forming the coils are supported prior to their engagement by either of the inner or outer forming members. Since the arms 57 of the inner forming members extend outwardly from the inner forming jaws 56 to the inner cam 72 in positions which are axially beyond the unformed position of the end turns 31 and 36, there is no interference between the stator structure and the inner forming members as the inner forming members are moved.

The mechanism then is in the position as illustrated in FIG. 4. That is, the inner and outer forming members, more particularly the inner and outer jaws 56 and 60 confine the end turns in a first direction relative to the stator core, i.e. radially with respect to the core in the exemplification. Next the cylinder 104 is energized and forces the piston 108 upwardly. This action is carried through the adapter 110 and the rods 102 and moves the forming ring 101 upwardly between the inner and outer jaws. The forming ring engages the end turns 31 and 36 and exerts a compressive force on the end turns in a second direction relative to the stator core, i.e. axially in the core of the exemplification. The amount of compression of the end turns is controlled by the insert 112 engaging an appropriate flat 114 on the cylinder stop 115.

Next the cylinder 104 is energized to move the piston 108 in the opposite direction, thereby bringing the forming ring 101 back to its retracted position, shown in FIG. 4. Then the cylinders 91 and 96 are energized to move the pistons 92 and 97 in the opposite direction, thus rotating the cam rings 72 and 73 in the opposite directions. This moves the inner and outer forming members to their retracted positions. Now the stator core may be removed from the lower forming unit.

It is advantageous that the inner forming jaws 56 span adjacent coil groups of the inner or start winding; that is each of the inner jaws engage a portion of each of two adjacent coil groups and span the space therebetween. Also it is advantageous that the outer forming jaws 60 span adjacent coil groups of the main or outer winding. Also it is highly advantageous that, if the cuff supports are employed, the teeth 70 be positioned relative to the slots in the core so that they come smoothly between the slot liners. To this end the small slot 38 formed at one place in the core is used in conjunction with an insert 120 having an inwardly extending tongue 120a. The tongue 120a is received in the slot 38 as the core is mounted about the central mounting member 48. If the core 21 is mounted about the central mounting member center post 48 in any orientation other than with slot 38 in alignment with tongue 120a the core can not be fully mounted in the apparatus. This assures proper orientation at the core for the most advantageous forming operation.

The end turns on both sides of a core may be formed by the apparatus as thus far described merely by mounting the stator about the center post 48, forming the end turns on one side of the stator, reversing the stator mounting on the center post and forming the end turns on the other side of the stator. However, in mass production of motors it is very desirable to simultaneously form or shape the end turns on both sides of the core, and upper forming unit 41 is included in the exemplification for this purpose.

Figure 7:
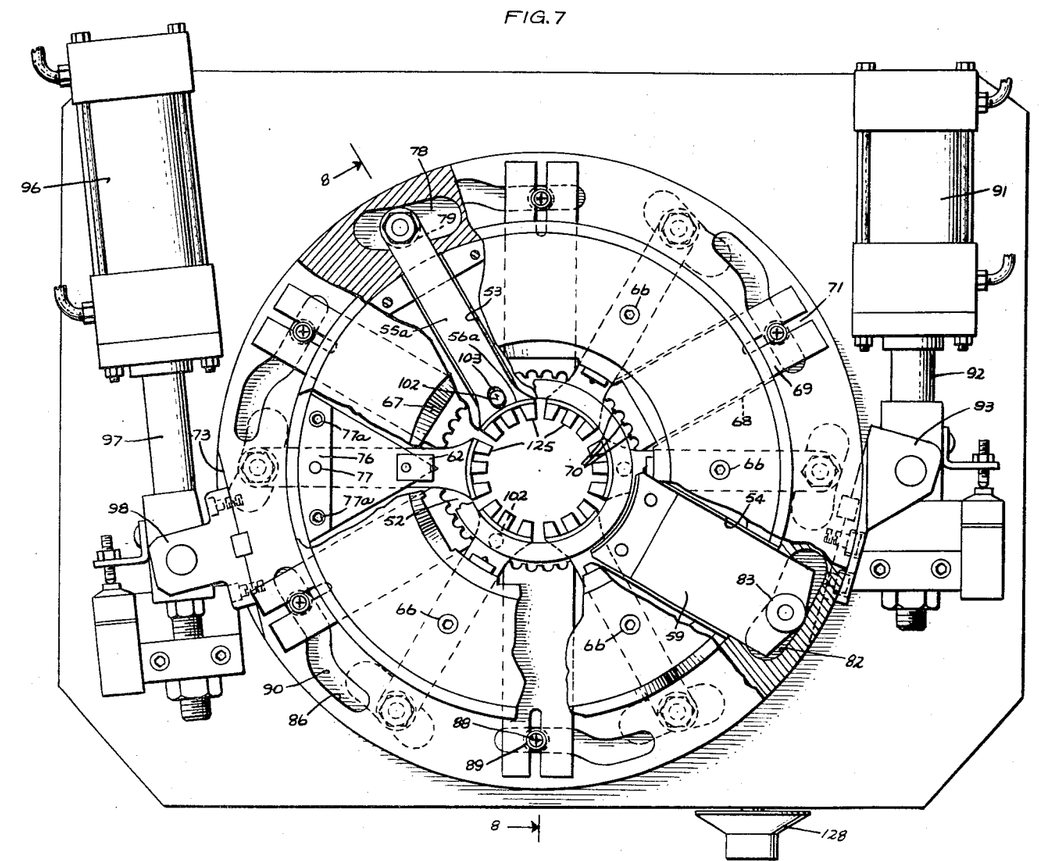
FIG. 7 is a bottom plan view of the upper winding end turn forming unit of the apparatus of FIG. 1 partially broken away and with certain parts in section for illustration.
Figure 8:
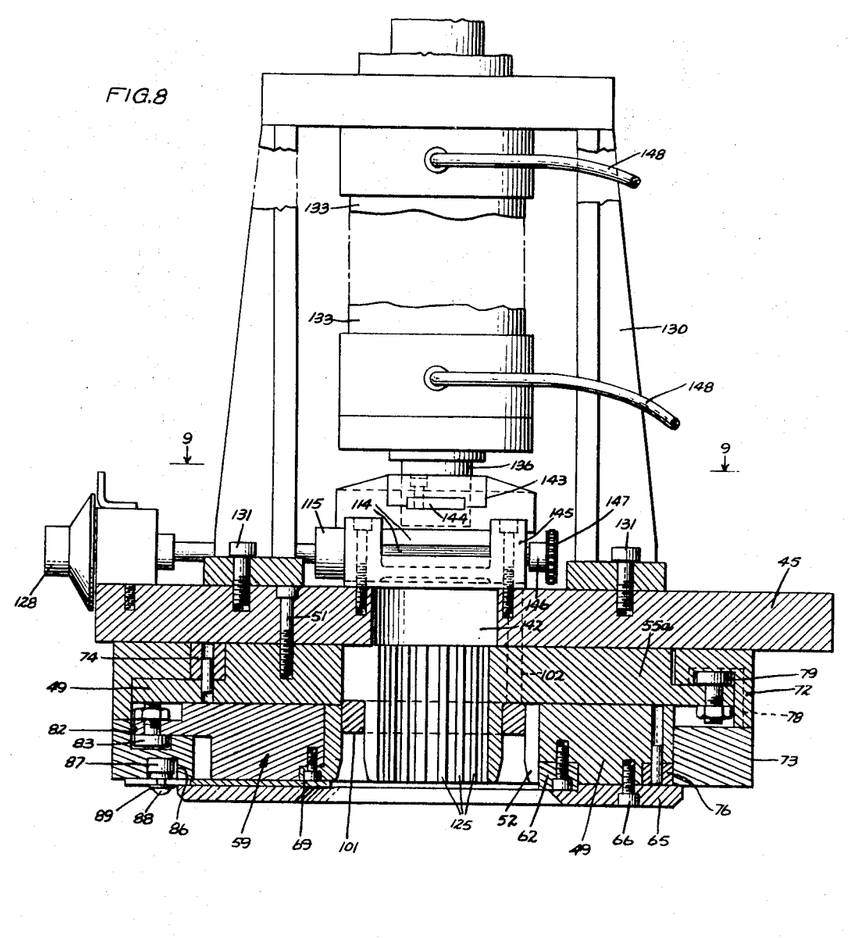
FIG. 8 is a partial side elevational view of the upper winding end turn forming unit, partially in section as seen along line 8-8 in FIG. 7.

Referring now particularly to FIGS. 7 and 8 there is shown in detail various aspects of the upper forming unit. It will be realized that in many respects the upper forming unit is very similar to lower forming unit and therefore the same numbers will be used for the same parts and the description will be somewhat shorter where appropriate. The upper forming unit includes a baseplate 45 to which is secured a cam plate 49 by bolts 51 and dowel pins. The cam plate includes a central opening 52, a plurality of inner guide slots 53 to receive and guide inner forming members 55a and a plurality of outer guide slots 54 to receive and guide outer forming members 59. The outer forming members 59 may be the same as in the lower forming unit; however, the inner forming members 55a differ slightly from those of the lower forming unit. The inner forming jaws 56a have spaced apart teeth 125 which interfit with the teeth 119 of the central mounting member or center post 48. Otherwise they may be similar to the inner forming members of the lower forming unit.

A number of inserts 62 are provided in the axially outer portion of the cam plate 49 to come into interferring relationship with the upper side of the motor stator core. A guide plate 65 is positioned over the cam plate 49 and held in position by suitable bolts. The upper guide plate includes a number of guide slots 68 which receive and guide cuff supports 69. The cuff supports have teeth 70 at their inner ends and slots 71 at their outer ends. There is provided an inner and an outer cam rings 72 and 73 as well as bearings 74 and 76 connected to the cam plate 49 for guiding the cam rings 72 and 73 as they rotate about the cam plate. Viewing in particular FIG. 7 there is shown in more detail the configuration of one of the bearings 76 with its associated dowel 77 and bolts 77a.

The inner cam plate 72 has a plurality of cam recesses 78 which act in conjunction with cam rollers 79 for moving the inner forming members 55a radially between their retracted and extended positions. Similarly outer cam ring 73 includes a first plurality of cam recesses 82 which cooperate with cam rollers 83 for moving the outer forming members 59 between their retracted and extended positions. Outer cam ring 73 also includes a second plurality of cam recesses 86 which cooperate with cam rollers 87 for moving the cuff supports 69 between their retracted and extended positions. Cam recesses 86 have knee portions 90 so that the cuff supports 69 of the upper forming unit are moved before the inner and outer forming members, as with the lower forming unit.

The upper forming unit also includes a hydraulic cylinder 91 and a piston 92 pivotally connected to a driving member 93 which, in turn, is connected to the inner cam ring 72. The upper forming unit also includes a second hydraulic cylinder 96 and associated piston 97 pivotally connected to a driving member 98 which, in turn, is connected to the outer cam ring 73. Thus, when the cylinders 91 and 96 of the upper forming unit are energized in the manner described for the corresponding cylinders in the lower forming unit, the associated pistons 92 and 97 actuate the driving members 93 and 98 for rotating the inner and outer cams 72 and 73 to move the inner forming members, the outer forming members, and the cuff supports between their extended and retracted positions.

The upper forming unit also includes a forming ring 101 which is carried by a number of rods 102 extending through slots 103 in the inner forming members 55a and appropriate openings in the base plate 45. Viewing now particularly FIGS. 8 through 10 it will be seen that the mechanism for moving the forming ring 101 and controlling the distance of movement of the forming ring is somewhat different than that of the lower forming unit. There is included a frame 130 which is secured at one end to the baseplate 45 by bolts 131. At its other end an adapter ring 132 is mounted on the outside of the frame, and a hydraulic cylinder 133 is mounted on the inside of the frame. Both the adapter ring and the hydraulic cylinder are secured to the frame by bolts 134. The piston 45 associated with the hydraulic cylinder 44 is received within the adapter ring 132 and is secured to the frame 130 by bolts 135.

The hydraulic cylinder 133 is connected to energize a piston 136. The free end 137 of the piston 136 is threadedly received in an opening 138 formed in a cylinder adapter 139. As best seen in FIG. 9 the piston 136 includes a pair of flats 140 which may be used to hold the piston as the adapter is screwed thereon. The rods 102, extending from the forming ring 101, are received in openings in the cylinder adapter 139 and secured thereto by bolts 141.

The mechanism for controlling the amount of movement of the piston 136 is somewhat different from that for controlling the movement of piston 108. To this end the cylinder adapter 139 includes a pair of outwardly extending wings 143 which project beyond the center opening 142. Each of the wings includes a hardened metal insert 144 which is positioned to come into contact with one of the flats 114 of a cylinder stop 115. There are two cylinder stops 115, with each of the stops being positioned on a different side of the center opening 142 and mounted in a generally U-shaped support member 145. One of the cylinder stops 115 is connected by a rod 118 to a manual control knob 128 so that a different one of the flats 114 may be presented to the associated insert 144 by rotation of the knob. On the opposite side of the cylinder stops from the knob 128 each of these cylinder stops 115 includes a sprocket 146, which are interconnected by a chain 147. As the knob 128 is rotated to control the positioning of one of the stops 115, the associated sprocket causes the chain 147 to turn the other sprocket and set the corresponding flat of the other cylinder stop for engagement by the other wing of the cylinder adapter 139.

Viewing now FIGS. 1 and 2 it will be seen that the hydraulic lines 148 from both of the cylinders 104 and 133 are connected to one header 149 of the hydraulic unit 43, both of the hydraulic lines 150 from hydraulic cylinder 44 are connected to another header 151 of the hydraulic power unit 43, and the hydraulic lines 152 from all of the cylinders 91 and 96 are connected to a third header 153 of the hydraulic 43. Thus, by appropriate energization of the headers 149, 151 and 153, the cylinder 44 will be energized independently, the cylinders 104 and 133 will be energized simultaneously, and all of the cylinders 91 and 96 will be energized simultaneously.

There also are provided a pair of electrical control buttons 154 which must be depressed simultaneously in order to start a cycle of operation. It will be understood that, as is common in the art, two physically separated start buttons are utilized to assure that the operator does not have either hand between the upper and lower forming units when cylinder 44 is energized to bring upper forming unit toward lower forming unit 40. The controls 154 are connected to an appropriate electric control circuit (not shown) for energizing the various portions of the apparatus in the desired sequence.

Figures 5, 6:
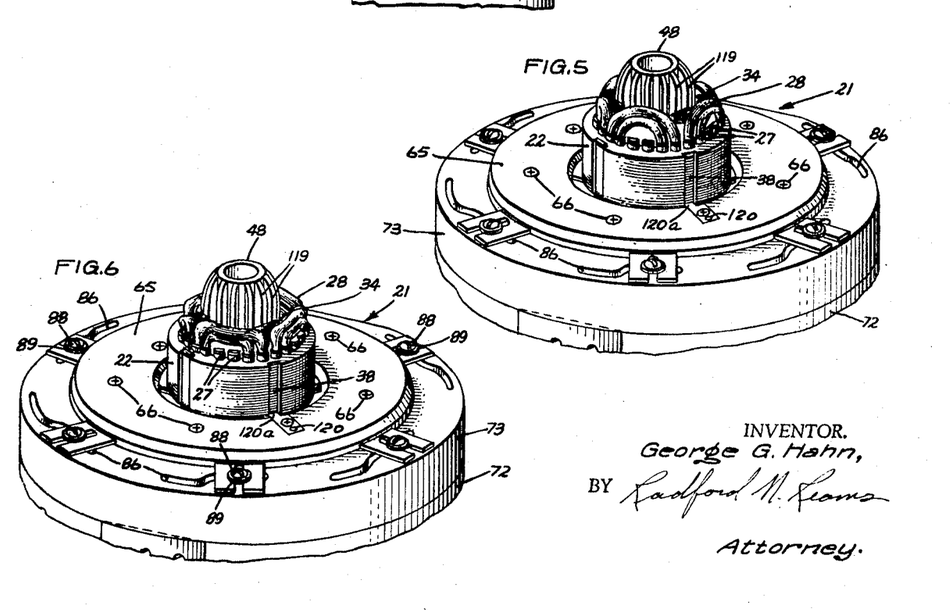
FIG. 5 is a fragmentary perspective view of the lower winding end turn forming unit, the stator positioned therein.
FIG. 6 is a fragmentary perspective view similar to FIG. 5 but showing the stator after winding end turn formation.
Figure 11:
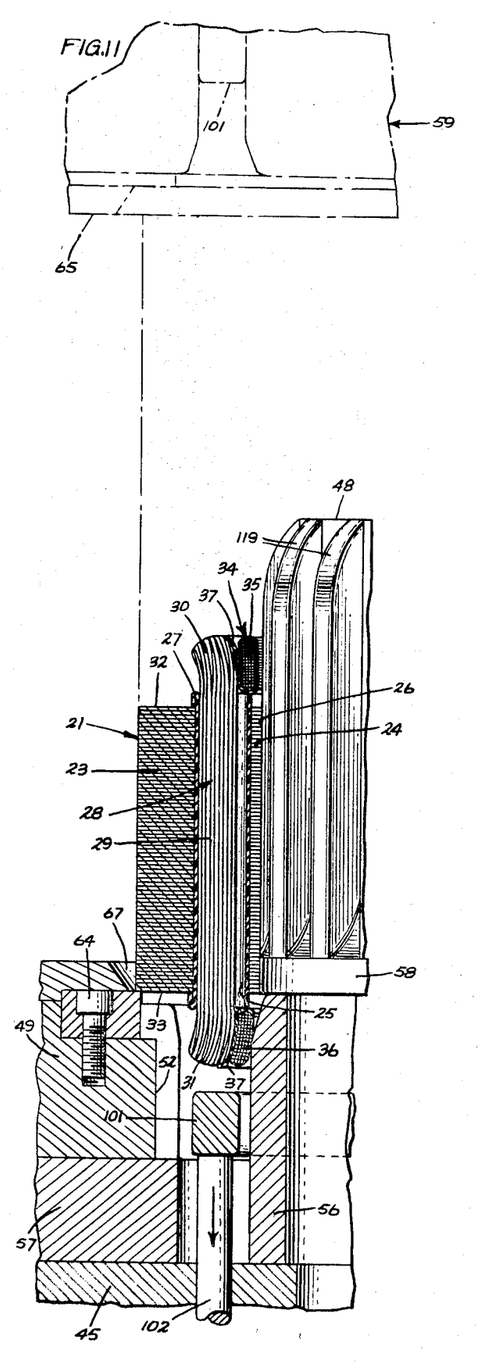
FIG. 11 is a somewhat schematic fragmentary elevational view of the apparatus of FIG. 1 partially in section, showing a core mounted about the center-mounting member and the forming members of the lower forming unit in their retracted positions.
Figure 12:
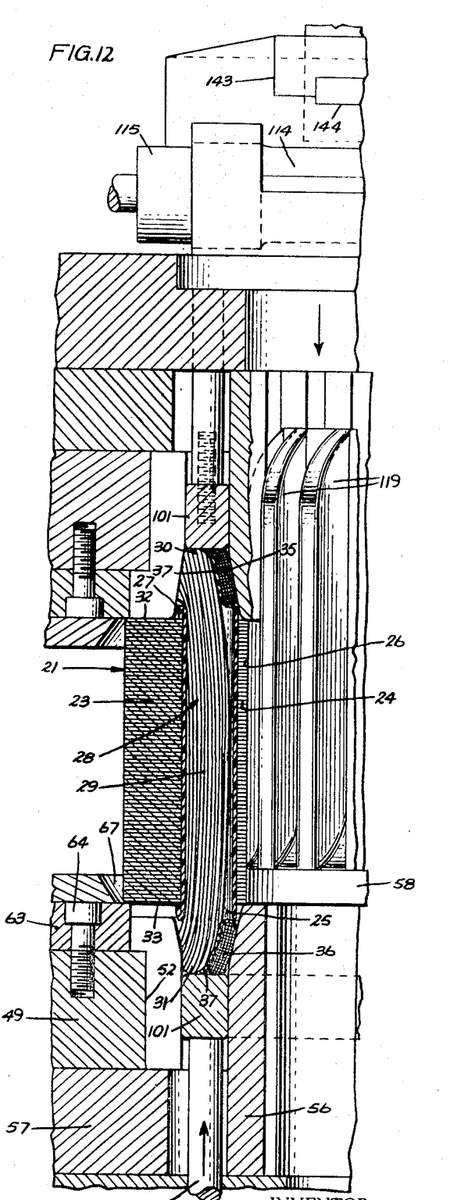
FIG. 12 is a fragmentary elevational view similar to FIG. 11 but with the forming members of both the upper and lower forming units in their extended positions.

Reviewing now briefly a sequence of operation for the exemplification apparatus, first a core with unformed end turns, as seen somewhat schematically in FIG. 5, is placed about the central mounting member 48. This provides the condition as seen in FIG. 11. Then the actuation buttons or controls 154 are simultaneously depressed, and first cylinder 44 is energized to drive piston 45 downwardly (as seen in FIGS. 1 and 2). Piston 45 moves frame 130 downwardly and frame 130 carries the remaining portions of the upper forming unit with it so that center opening 142, formed in upper forming unit baseplate 45 and inner forming members 55a, is received about the upper end of the center post 48, with the teeth 125 of the inner forming members 55a interfitting with the teeth 119 of the center post 48. This assures that the inner jaws 56a come into register with upper end turns of the stator inside all of the wires forming the end turns and prevents the upper forming unit from catching and damaging any of the wires. As the upper forming unit 41 comes into register with the upper end of the center-mounting member 48, a switch (not shown) may be tripped so that the operator may now release the activation controls 154. The upper forming unit continues downwardly until the inserts 62 engage the upper side face of the core 21.

Then both of the cylinders 91 and both of the cylinders 96 are activated to simultaneously rotate both of inner and both of the outer cam rings. This causes first the cuff supports to come into engagement with the slot liners and then the inner and outer forming members to move to their extended positions restraining the end turns in a first direction. Thereafter the cylinders 104 and 133 are simultaneously energized causing the lower forming ring to move upwardly until the insert 112 engages the appropriate flat of the associated cylinder stop 115 and the upper forming ring to move downwardly until the inserts 144 in the wings 143 engage the appropriate flats 114 of the associated cylinder stops 115. This provides the condition shown in FIG. 12.

Thereafter the energization of the hydraulic cylinders 104 and 133 are simultaneously reversed to cause the forming rings to withdraw to their retracted positions. Then the energization of the hydraulic cylinders 91 and 96 are reversed to cause the inner and outer forming members and the cuff supports to withdraw to their retracted position. Then the energization of hydraulic cylinder 44 is reversed to cause the upper forming unit 41 to be retracted to its upper position (as seen in FIGS. 1 and 2). At this time the entire apparatus is deactivated and the operator may remove the stator core with both end turns having been formed or shaped, as generally indicated in FIG. 6.

Thus, it will be seen that by the present invention I have provided an apparatus which simultaneously forms both end turns of the core member. By the use of the inner forming jaws which are moved to their extended position through arms that extend outwardly at locations axially beyond the unformed position of the end turns I have been able to provide a central mounting member. The central mounting member in turn assures proper positioning of the stator cores in the apparatus. Also the cylinder stops, with their various flats positioned at different heights relative to the associated pistons and piston adapters enables me to selectively vary the compressive force applied to the end turns. Also the inner and outer forming jaws are moved to their extended positions restraining the end turns in a first direction while the forming rings are axially beyond the unformed positions of the end turns and, in their extended positions the inner and outer jaws closely confine the sides of the forming rings. This precludes individual wires of the end turns from being caught between the various forming members and thereby damaged.

While the present invention has been described by reference to a preferred embodiment thereof, it is to be understood that modifications may be made by those skilled in the art without actually departing from the invention.

What I claim as new and desire to secure by Letters Patent of the United States is:

1. An apparatus for forming at least one magnetic core winding end turn assembly, said apparatus including:
    a. a center-mounting member for receiving the magnetic core thereabout;
    b. first and second wall means spaced apart in a first direction relative to the magnetic core to receive the at least one end turn assembly therebetween;
    c. at least one of said first and second wall means being movable relative to the other of said first and second wall means for confining the at least one end turn assembly in the first direction relative to the magnetic core; and
    d. third wall means movable in a second direction relative to the magnetic core between said first and second wall means for applying a compressive force on the at least one winding end turn assembly to form the at least one end turn assembly into a compact mass.

2. An apparatus as set forth in claim 1, including stop means selectively adjustable relative to said third wall means for selectively varying the amount of compression of the at least one winding end turn assembly.

3. An apparatus as set forth in claim 1; wherein each of said first and second wall means has a retracted position removed from the preformed position of the at least one end turn assembly and an extended position toward the at least one end turn assembly from its retracted position; said first and second wall means in their extended positions confining the at least one end turn assembly in the first direction relative to the magnetic core.

4. An apparatus as set forth in claim 3; including first cam means for moving said first wall means between its extended and retracted positions, second cam means moving said second wall means between its extended and retracted positions and power means for actuating said first and second cam means.

5. An apparatus for forming at least one magnetic core winding end turn assembly, said apparatus including:
    a. first wall means having a retracted position, radially outward of the preformed position of the at least one end turn assembly, and an extended position, radially inward of its retracted position;
    b. first actuation means connected to said first wall means for moving said first wall means between its retracted and extended positions;
    c. second wall means having a retracted position, radially inward of the preformed position of the at least one end turn assembly, and an extended position, radially outward from its retracted position;
    d. second actuation means, radially outward of the preformed position of the at least one end turn assembly, for moving said second wall means between its retracted and extended positions;
    e. connection means interconnecting said second wall means and said second actuation means, said connection means extending therebetween axially beyond the preformed position of the at least one end turn assembly;
    f. said first and second wall means, in their extended positions, confining the at least one end turn assembly in a first direction relative to the magnetic core; and
    g. third wall means movable, in a second direction relative to the magnetic core, between said first and second wall means for applying a compressive force in the second direction on the at least one end turn assembly to form the at least one end turn assembly into a compact mass.

6. An apparatus as set forth in claim 5 including stop means selectively adjustable relative to said third wall means for selectively varying the amount of compression of the at least one end turn assembly.

7. An apparatus as set forth in claim 5 wherein; said first actuation means includes cam means for moving said first wall means between its retracted and extended positions; said second actuation means including cam means for moving said second wall means between its extended and retracted positions; and power means for actuating said first and second cam means.

8. An apparatus as set forth in claim 5 including; a center-mounting member for receiving the magnetic core thereabout, said center-mounting member guiding the at least one end turn assembly to between said first and second wall means.

9. An apparatus for forming at least one magnetic core winding end turn assembly, said apparatus including:
 a. a plurality of arcuate outer jaws positioned relative each other to form an outer wall means;
 b. first cam means connected to said outer jaws for moving said outer jaws between a retracted position outward of the preformed position of the at least one end turn assembly, and an extended position, inward of their retracted position;
 c. a plurality of arcuate, inner jaws positioned relative to each other to form an inner wall means;
 d. a plurality of arms, each arm connected to and extending radially outwardly from a corresponding inner jaw axially beyond the preformed position of the at least one end turn assembly;
 e. second cam means connected to said arms for moving said inner jaws between a retracted position, inward of the preformed position of the at least one end turn assembly and an extended position, outward of their retracted position;
 f. said inner and outer jaws, in their extended positions, confining the at least one winding end turn assembly in a first direction relative to the magnetic core; and
 g. a forming ring, movable in a second direction relative to the magnetic core between said inner and outer jaws for applying a compressive force on the at least one end turn assembly to form the at least one end turn assembly into a compact mass.

10. An apparatus as set forth in claim 9 including; a center-mounting member for receiving the magnetic core thereabout, the outer surface of said center-mounting member being substantially in alignment with said inner jaws for guiding the at least one end turn assembly to between said inner and outer jaws.

11. An apparatus as set forth in claim 9 including; a center-mounting member for receiving the magnetic core thereabout; at least said inner jaws being axially movable between a position axially removed from said center-mounting member sufficiently to allow mounting of the magnetic core on the center-mounting member and a position overlapping said mounting member; said inner jaws and said center-mounting member having corresponding lands and grooves which interfit when said inner jaws overlap said center-mounting member so that the at least one end turn assembly is guided to between said inner and outer jaws.

12. An apparatus for forming a pair of magnetic core winding end turn assemblies, said apparatus including:
 a. a center-mounting member for receiving the magnetic core thereabout;
 b. a first end turn forming unit positioned to be in register with one of the end turn assemblies when the magnetic core is received about said center-mounting member;
 c. said first end turn forming unit including first inner wall means, first outer wall means and first end wall means;
 d. said first inner and outer wall means being spaced apart in a first direction relative to the magnetic core to receive the one of the end turn assemblies therebetween; at least one of said first inner and outer wall means being movable relative to the other of said first inner and outer wall means for confining the one of the end turn assemblies in the first direction relative to the magnetic core;
 e. said first end wall means being movable in a second direction relative to the magnetic core between said first inner and outer wall means for applying a compressive force on the one of the end turn assemblies to form the one of the end turn assemblies into a compact mass;
 f. a second end turn forming unit axially movable with respect to said center-mounting member between a position allowing mounting of the magnetic core about said center-mounting member and a position in register with the other of the end turn assemblies when the magnetic core is received about said center-mounting member;
 g. said second end turn forming unit including second inner wall means, second outer wall means and second end wall means;
 h. said second inner and outer wall means being spaced apart in a first direction relative to the magnetic core to receive the other of the end turn assemblies therebetween; at least one of said second inner and outer wall means being movable relative to the other of said second inner and outer wall means for confining the other of the end turn assemblies in the first direction relative to the magnetic core; and
 i. said second end wall means being movable in a second direction relative to the magnetic core between said second inner and outer wall means for applying a compressive force on the other of the end turn assemblies to form the other of the end turn assemblies into a compact mass.

13. An apparatus as set forth in claim 12, including stop means associated with each of said first and second end wall means, each of said stop means being selectively adjustable relative to said end wall associated therewith for selectively varying the amount of compression of the end turn assemblies.

14. An apparatus as set forth in claim 12 wherein; each of said inner wall means includes a plurality of inner jaws and a plurality of arms, each of said arms being connected to and extending radially outwardly from a corresponding inner jaw axially beyond the preformed position of the associated end turn assembly; and cam means connected to said arms for moving said inner jaws in the first direction relative to the magnetic core.